United States Patent [19]

Imai

[11] Patent Number: 5,109,290
[45] Date of Patent: Apr. 28, 1992

[54] IMAGE RECORDING SYSTEM FOR RECORDING IMAGE PLANE COMPRISING PIXEL AREA AND NON-PIXEL AREA

[75] Inventor: Masaaki Imai, Bisai, Japan

[73] Assignee: Brother Kogyo Kabushiki Kaisha, Nagoya, Japan

[21] Appl. No.: 675,941

[22] Filed: Mar. 27, 1991

[30] Foreign Application Priority Data

Jun. 29, 1990 [JP] Japan .................................. 2-173737

[51] Int. Cl.⁵ .............................................. G02F 1/13
[52] U.S. Cl. ....................................... 359/54; 359/72; 313/523; 340/724
[58] Field of Search ................... 350/331 R, 330, 334, 350/333, 342, 368, 363; 313/523; 340/723, 724; 355/214

[56] References Cited

U.S. PATENT DOCUMENTS

| | | | |
|---|---|---|---|
| 4,334,734 | 6/1982 | Hareng et al. | 350/331 R |
| 4,571,053 | 2/1986 | Kasama et al. | 350/342 X |
| 4,668,071 | 5/1987 | Mayer | 350/331 R X |
| 4,746,917 | 5/1988 | Di Santo et al. | 350/362 X |
| 4,810,058 | 3/1989 | Sangyoji et al. | 350/331 R |
| 4,834,506 | 5/1989 | Demke et al. | 350/333 |

Primary Examiner—Stanley D. Miller
Assistant Examiner—Huy K. Mai
Attorney, Agent, or Firm—Oliff & Berridge

[57] ABSTRACT

The present invention relates to an image recording system for recording an image formed on an image plane onto a photosensitive member by exposure, the image plane comprising a plurality of pixels capable of changing over between a first state which permits the exposure of light to the photosensitive member and a second state in which the exposure of light to the photosensitive member is infeasible, and a non-pixel area present at a peripheral area with respect to the pixels. The size of each pixel is set such that the length of a side in a pixel pitch direction is slightly larger than one half of the pixel pitch. In this image recording system, therefore, when recording an image on the photosensitive member, an exposure position controlling means causes a relative position changing means to shift a relative position of the photosensitive member and the image plane at least three times so as to prevent recording of the non-pixel area in the image recorded on the photosensitive member.

16 Claims, 7 Drawing Sheets

Fig.4
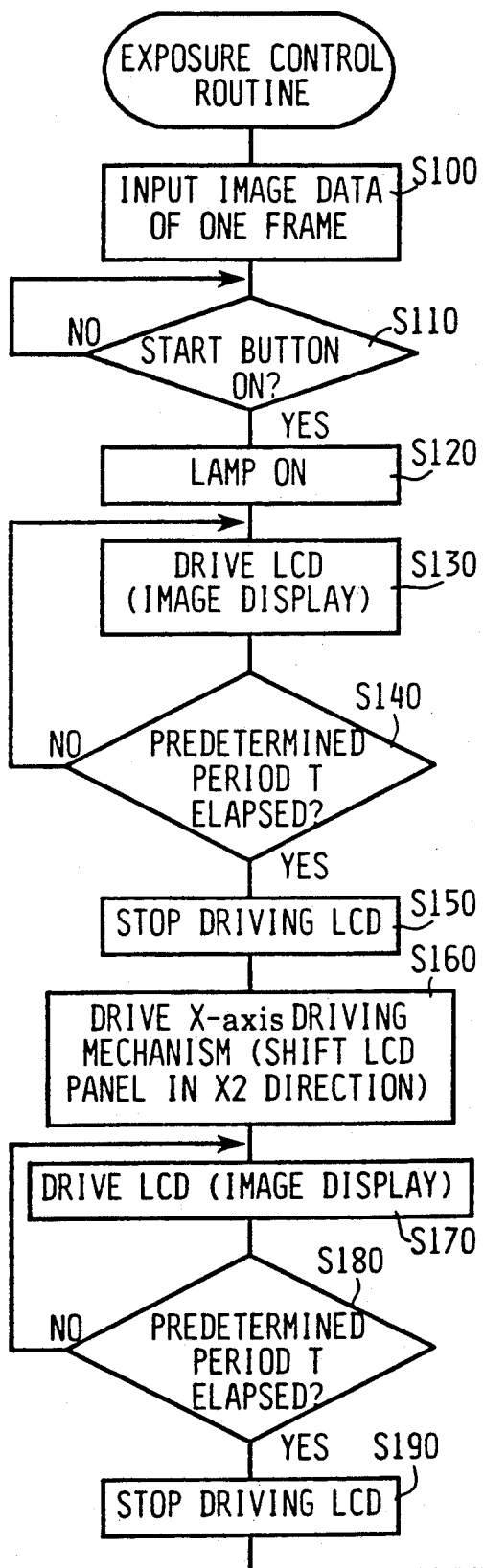
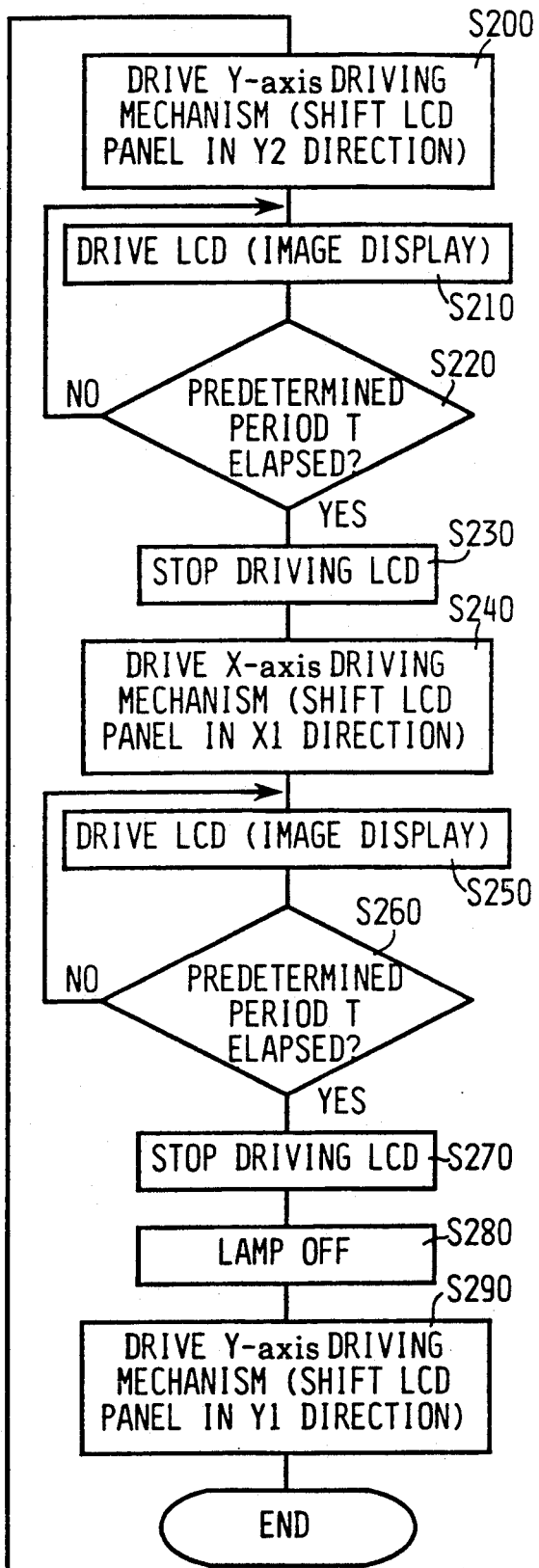

IMAGE RECORDING SYSTEM FOR RECORDING IMAGE PLANE COMPRISING PIXEL AREA AND NON-PIXEL AREA

BACKGROUND OF THE INVENTION

1. Field of the Invention

The present invention relates to an image recording system for recording an image by exposing light from an image plane and more particularly to an image recording system for recording an image by exposing light from an image plane to a photosensitive member wherein the image plane comprises a pixel area and a non-pixel area.

2. Description of Related Art

Heretofore, as an image recording system of this type, there has been known an exposure device utilizing a liquid crystal shutter matrix which is disclosed in U.S. Pat. No. 4,810,058. In this exposure device, an image is formed on a panel of a shutter unit including a transmission type LCD panel, and, thereafter, light is radiated from above the LCD panel. The light transmitted through the transmission type LCD panel is directed to a photosensitive medium such as photosensitive paper, whereby the image formed on the panel is recorded on the photosensitive medium. On the transmission type LCD panel, an image plane is composed of plural pixels, and an image is formed on the panel by turning ON and OFF the pixels to render the pixels transparent or opaque, respectively. The pixels are each generally in the form of a square and occupy about 25% of the total area of the image plane. The remaining 75% is a non-pixel area comprised of a wiring pattern. Upon radiation of light from above the transmission type LCD panel with an image formed thereon, the light is intercepted at the pixel portion which is opaque, while it is transmitted at the pixel portion which is transparent. Accordingly, the light passes through the transmission type LCD panel according to the image on the panel and the transmitted light exposes the photosensitive paper. The transmission type LCD panel is, thus a light switch array which transmits the light radiated from above the upper surface only at the area of transparent pixels. Therefore, the image formed on the photosensitive paper by the exposure corresponds to the image displayed on the transmission type LCD panel. Since the pixels occupy 25% of the image plane, if adequate movements of the LCD panel twice in the X direction (X3, X4) and twice in the Y direction (Y3, Y4) are followed by exposure of the photosensitive paper in the respective positions, the non-pixel area on the transmission type LCD is theoretically not recorded on the photosensitive paper.

However, the following problem occurs in the above exposure device. Since the accuracy of a driving means is not perfect, if exposure is actually performed in the above manner, the recorded image will be deteriorated in both contrast and quality. More particularly, if the accuracy of the driving means which is for moving the shutter unit in the X or Y direction is not perfect, then, for example as shown in FIG. 7, exposed areas are spaced from each other. In the nonexposed spaces, a black line appears on the recorded image though it is a very fine line. In FIG. 7, there is illustrated only one pixel. Thus, if the accuracy of the driving means is not perfect, part of the wiring pattern is projected blackly on the image recorded on the photosensitive paper, resulting in the contrast and quality of the recorded image being deteriorated.

SUMMARY OF THE INVENTION

An object of the present invention is to provide an image recording system capable of affording a recorded image having high contrast and quality.

According to the present invention, in order to achieve the above-mentioned object, there is provided an image recording system as illustrated in FIG. 1, wherein an image formed on an image plane is recorded on a photosensitive member by exposure, the image plane comprising a plurality of pixels and a non-pixel area present at a peripheral area with respect to the pixels, the pixels having a uniform size and being capable of changing over between a first state which permits the exposure of light to the photosensitive member and a second state in which the exposure of light to the photosensitive member is not permitted, the size of each pixel being such that the length of a side in a pixel pitch direction is slightly larger than one half of the pixel pitch, the image recording system including a relative position changing means for changing a relative position of the photosensitive member and the image plane in a direction substantially perpendicular to a light traveling path from the image plane, and an exposure position controlling means which drives the relative position changing means at least three times to shift the relative position of the photosensitive member and the image plane so that the non-pixel area is not recorded in the image recorded on the photosensitive member.

The image recording system of the present invention having the above construction uses an image plane comprising a plurality of pixels and a non-pixel area present at a peripheral area with respect to the pixels and exposes a photosensitive member to light from the image plane to record an image thereon. The size of each pixel on the image plane is such that the length of a side in a pixel pitch direction is slightly larger than one half of the pixel pitch PP (shown in FIG. 3). The exposure position controlling means drives the relative position changing means to change a relative position of the photosensitive member and the image plane in a direction substantially perpendicular to the light traveling path, thereby shifting the exposure position for the photosensitive member to the position corresponding to the non-pixel area before the driving. As a result, even when a driving means is used which is not extremely accurate, there is no longer formed a non-exposed area between exposed areas on the photosensitive member, i.e., the contrast and quality of the recorded image are no longer deteriorated.

BRIEF DESCRIPTION OF THE DRAWINGS

The above and other objects, features and advantages of the invention will become more apparent from reading the following description of the preferred embodiment taken in connection with the accompanying drawings, in which:

FIG. 4 is a flowchart showing an exposure control routine;

DETAILED DESCRIPTION OF THE PREFERRED EMBODIMENT

Referring to the accompanying drawings, a preferred embodiment of the invention will now be described in detail.

Figure 1:
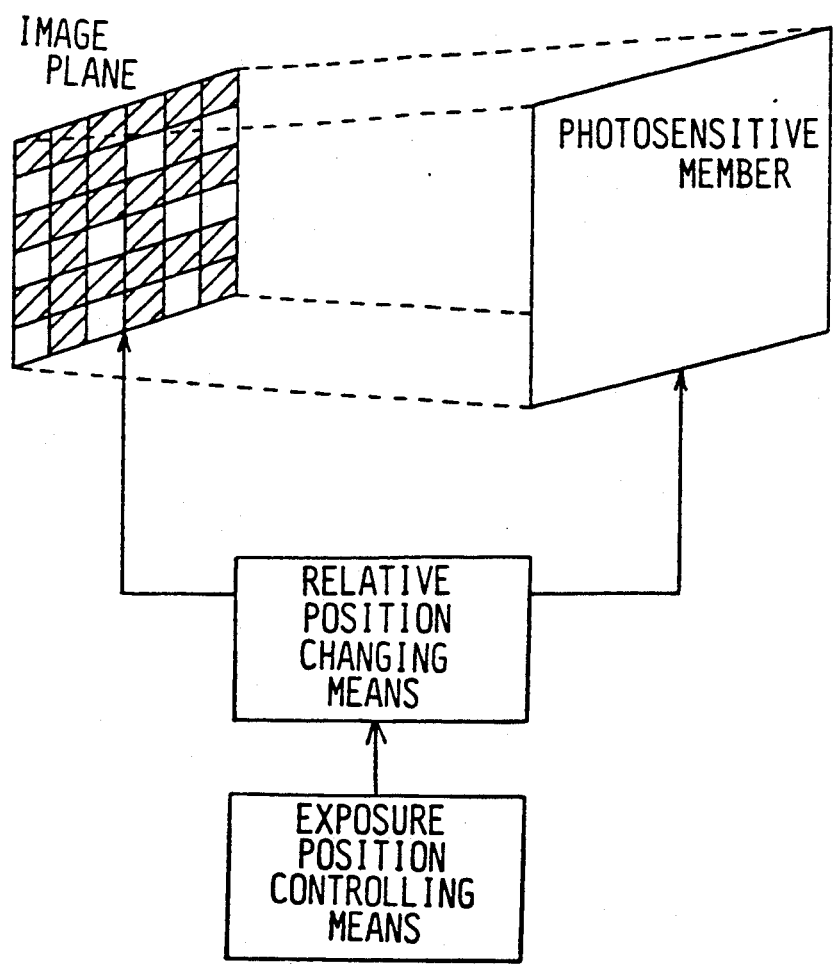
FIG. 1 is a block diagram illustrating a basic construction of the present invention.
Figure 2:
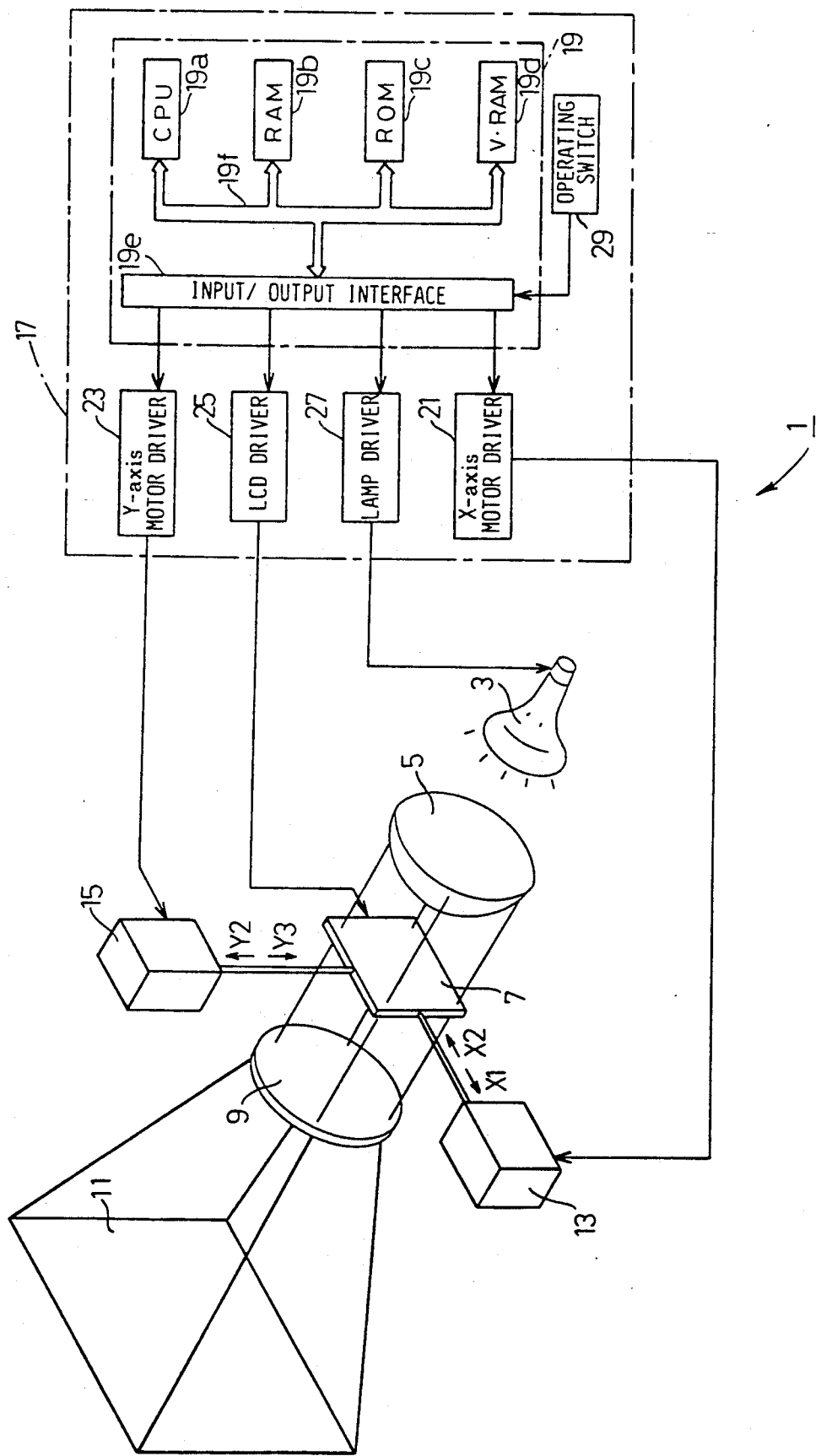
FIG. 2 is a schematic construction diagram of an image recording system according to the present invention.

FIG. 2 is a schematic construction diagram of an image recording system used in an LCD printer according to an embodiment of the present invention. The image recording system, indicated at 1, includes a lamp 3 (halogen lamp) serving as a light source and the following components arranged successively from the light source side: a condenser lens 5, an LCD panel 7, a focusing lens 9, a photosensitive paper 11, a lateral panel driving mechanism (hereinafter referred to as the "X-axis driving mechanism") 13, a vertical panel driving mechanism (hereinafter referred to as the "Y-axis driving mechanism") 15, and a projection control unit 17.

The condenser lens 5 is for collimating the light from the lamp 3 into parallel beams of light, which are directed to the LCD panel 7.

The LCD panel 7, which is a liquid crystal display device for making a dot matrix display, controls the orientation of liquid crystal molecules according to whether pixels are electrified or not, and then forms and displays an image by a change-over between a bright state (transparent) and a dark state (opaque) according to image data. Since this construction is well known, the details thereof are here omitted. The light emitted from the lamp 3 passes through the LCD panel 7 if the pixel involved is in a bright state, while it is intercepted if the pixel involved is in a dark state. Consequently, the projection image passing through the panel 7 corresponds to the image displayed on the same panel.

Figure 3:
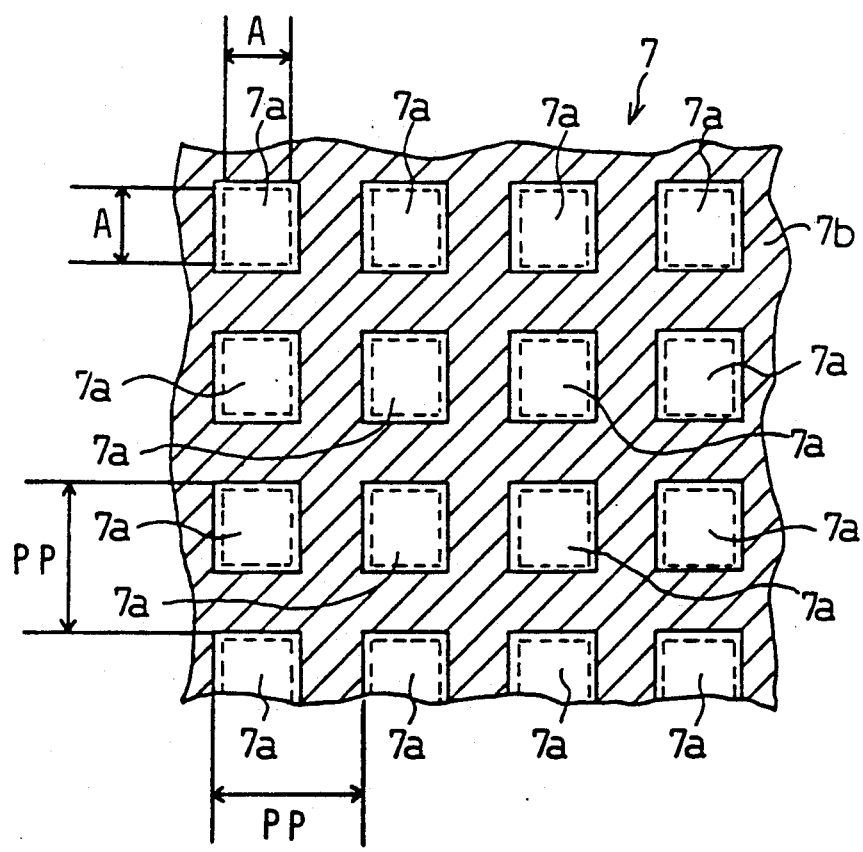
FIG. 3 is an explanatory view showing pixels and a wiring pattern on an LCD panel.

On the image plane of the LCD panel 7 there is formed a wiring pattern 7b (hatched portion in FIG. 3) between adjacent pixels 7a for driving the liquid crystals as shown in FIG. 3. The pixels 7a used herein each indicate an effective display portion using liquid crystals, namely a portion which permits the transmission of light. The pixels 7a are each in the form of a rectangle or square as seen in the irradiating direction and are arranged in a matrix form. The total area of the pixels relative to the area of the image plane is set at a value slightly larger than (100/n)% where n is an integer number. In the described embodiment, the squares defined by broken lines in the pixels 7a represent portions corresponding to a percent opening (an effective display area relative to the whole image plane) panel 7 is slightly larger than 25%. The wiring pattern 7b does not transmit the light from the light source, but intercepts it at all times.

A projection image of the light which has passed through the LCD panel 7 is focused onto the photosensitive paper 11 by the focusing lens 9. Thus, the photosensitive paper 11 is exposed to the transmitted light and records the image displayed on the LCD panel 7.

The X-axis and Y-axis driving mechanisms 13, 15 are each provided with a stepping motor and drive the LCD panel 7 to shift the panel independently in the arrow directions X1, X2 and the arrow directions Y1, Y2 in the figure, the arrow directions being perpendicular to the optical axis in accordance with a signal provided from the projection control unit 17.

The projection control unit 17 comprises an electronic controller 19, X-axis and Y-axis motor drivers 21, 23 for outputting driving signals to the stepping motors of the X-axis and Y-axis driving mechanisms 13, 15, respectively, an LCD driver 25 for driving the LCD panel 7, a lamp driver 27 for lighting the lamp 3, and an operating switch 29.

The electronic controller 19 comprises a CPU 19a constituted as an arithmetic logical operation circuit, a RAM 19b, a ROM 19c which stores an exposure control routine, a video RAM (V RAM) 19d for storing image data, an input/output interface 19e for transmitting and receiving signals between the electronic controller 19 and the drivers 21, 23, 25, 27, the operating switch 29, and a bus 19f for the interconnection of the components of the electronic controller 19.

In the image recording system 1 thus constructed, therefore, the position of the LCD panel 7 perpendicular to the optical axis is set by controlling the X-axis and Y-axis driving mechanisms 13, 15 through the projection control unit 17.

An exposure control processing which is executed by the electronic controller 19 will be described below. FIG. 4 is a flowchart showing the exposure control routine stored in ROM 19c which is started when a printing mode is selected in the image recording system.

Figure 5:
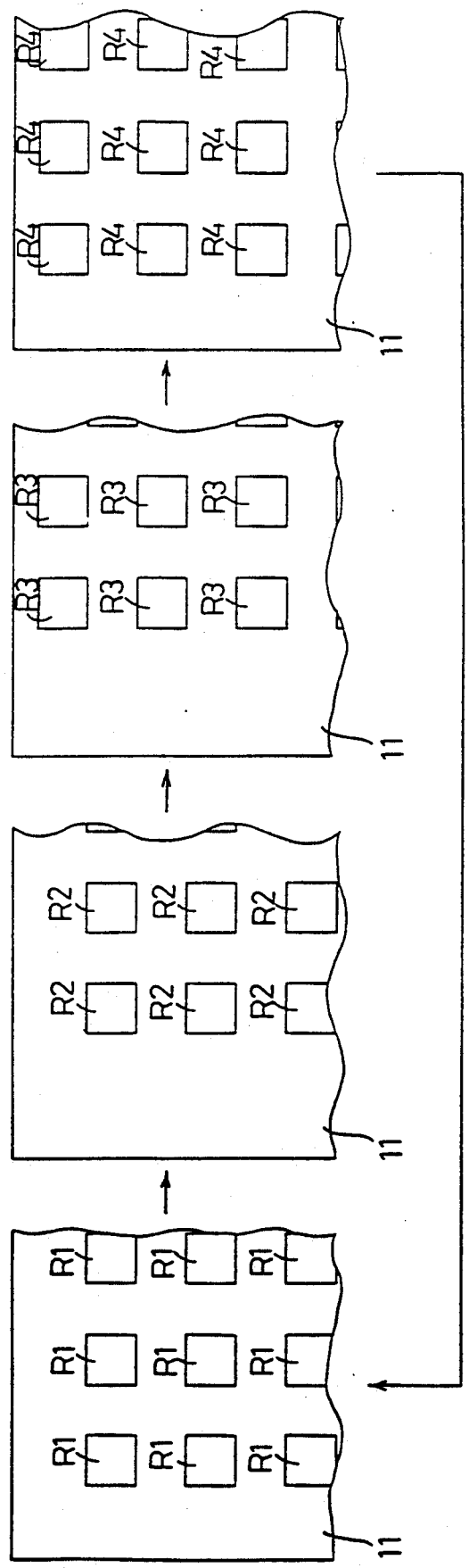
FIG. 5 is an explanatory view showing exposed areas on a photosensitive paper.

First, the CPU 19a inputs image data corresponding to one frame from the V RAM 19d (S100) and then judges whether a start button (not shown) of the operating switch 29 has been turned ON or not (S110). The CPU 19a stands by until the start button is turned ON by the user. When the user turns ON the start button, the CPU 19a causes the lamp driver 27 to light the lamp 3 (S120). Subsequently, the CPU 19a causes the LCD driver to drive the LCD with a drive signal corresponding to the image data, allowing an image of one frame to be displayed on the LCD panel 7 (S130). Then, the CPU 19a judges whether a predetermined period T sufficient to expose the photosensitive paper 11 to light has elapsed or not (S140) and executes the processing of step 130 until the predetermined period T has elapsed. Once the CPU 19a judges that the predetermined period T has elapsed, it causes the LCD driver to stop driving the LCD (S150). At this time, all the pixels 7a on the LCD panel 7 are assumed to be in a dark state and the light from the lamp 3 is intercepted by the panel 7. Therefore, only for the predetermined period T is the projection image from the LCD panel 7 formed on the photosensitive paper 11 by exposure. In a first step, FIG. 5 illustrates first exposure areas R1. In each of the exposure areas R1, the light which has passed through each pixel 7a on the LCD panel 7 exposes the photosensitive paper 11. It is here assumed that the pixels 7a are all in a bright state (transparent). In FIG. 5, the photosensitive paper 11 is seen from the light radiation side.

When the processing of step 150 is over, the CPU 19a causes the X-axis motor driver 21 to output a driving signal to the X-axis driving mechanism 13, thereby moving the LCD panel 7 a predetermined distance A in the X2 direction shown in FIG. 2 (S160). As shown in FIG. 3, the moving distance A is set equal to the length of one side of each square inside each pixel 7a on the LCD panel 7, which squares are indicated by broken lines and indicate a 25% opening area.

When the LCD panel 7 is moved the predetermined distance a by means of the X-axis driving mechanism 13, the CPU 19a causes the LCD driver 25 to drive the LCD for only the predetermined period T to form an image on the panel. Then, as the lamp 3 has been lighting since it was turned ON in step 120, the light which has passed through the bright-state pixels 7a on the LCD panel 7 is applied to the photosensitive paper 11. Consequently, the photosensitive paper 11 is exposed by a projection image according to the image formed on the LCD panel (S170). Next, the CPU 19a judges whether the predetermined period T sufficient for the exposure of the photosensitive paper 11 has elapsed or not (S180). The CPU 19a causes the LCD driver to execute the processing of step 170 until the predetermined period T has elapsed. Once the CPU 19a judges that the predetermined period T has elapsed, it causes the LCD driver to stop driving the LCD (S190). At this time, all the pixels 7a on the LCD panel assume a dark state and the light emitted from the lamp 8 is intercepted by the LCD panel 7. The projection image from the LCD panel 7 is exposed to the photosensitive paper 11. Therefore, in a second step, as shown in FIG. 5, second exposure areas R2 for exposure to the photosensitive paper 11 through the pixels 7a have been shifted rightward in the figure approximately by one pixel from the first exposure areas R1 in step 130.

Then, the CPU 19a causes the Y-axis motor driver 23 to output a driving signal for the Y-axis driving mechanism 15, thereby moving the LCD panel 7 by the predetermined distance A in the Y2 direction shown in FIG. 2. Next, the CPU 19a causes the LCD driver 25 to drive the LCD by the predetermined period T to form an image on the panel. Then, as the lamp 3 has been lighting since it was turned ON in step 120, the light which has passed through the bright-state pixels 7a on the LCD panel 7 is applied to the photosensitive paper 11. Consequently, the photosensitive paper 11 is exposed by a projection image according to the image formed on the LCD panel 7 (S210). Next, the CPU 19a judges whether the predetermined period T sufficient for the exposure of the photosensitive paper 11 has elapsed or not (S220). The CPU 19a causes the LCD driver 25 to execute the processing of step 210 until the predetermined period T has elapsed. Once the CPU 19a judges that the predetermined period T has elapsed, it causes the LCD driver to stop driving the LCD (S230). At this time, all the pixels 7a on the LCD panel 7 are assumed in a dark state and the light from the lamp 3 is intercepted by the LCD panel 7. Therefore, only for the predetermined period T is the projection image from the LCD panel 7 formed on the photosensitive paper 11 by exposure. As shown in FIG. 5, therefore, third exposure areas R3 for exposure to the photosensitive paper 11 shift upward by approximately one pixel from the second exposure areas R2 in step 170.

Subsequently, the CPU 19a causes the X-axis motor driver 21 to output a driving signal for the X-axis driving mechanism 13, thereby moving the LCD panel 7 by the predetermined distance A in the X1 direction shown in FIG. 2 (S240). Further, the CPU 19a causes the LCD driver 25 to drive the LCD for the predetermined period T to form an image on the panel. Then, as the lamp 3 has been lighting since it was turned ON in step 120, the light which has passed through the bright-state pixels 7a on the LCD panel 7 is directed to the photosensitive paper 11, so that the paper 11 is exposed by a projection image according to the image formed on the LCD panel 7 (S250). Then, the CPU 19a judges whether the predetermined period T sufficient for the exposure of the photosensitive paper 11 has elapsed or not (S260). The CPU 19a causes the LCD driver 25 to execute the processing of step 250 until the predetermined period T has elapsed. Once the CPU 19a judges that the predetermined period T has elapsed, it causes the LCD driver to stop driving the LCD (S270). At this time, all the pixels 7a on the LCD panel 7 are assumed to be in a dark state, and, hence, the light from the lamp 3 is intercepted by the LCD panel 7. The projection image from the LCD panel 7 is thus exposed to the photosensitive paper 11 only for the predetermined period T. Consequently, as shown in FIG. 5, fourth exposure areas R4 for exposure to the photosensitive paper 11 shift leftward by approximately one pixel from the third exposure areas R3 in step 210.

When the above processing is over, the exposure position controlling means has driven the relative position changing means at least (n-1) times to shift the position of the image plane. The CPU 19a causes the lamp driver 27 to turn OFF the lamp 3 (S280) and then causes the Y-axis motor driver 23 to output a driving signal for the Y-axis driving mechanism 15, thereby moving the LCD panel 7 to move only by the predetermined distance A in the Y1 direction shown in FIG. 2 (S290). Therefore, the panel is returned to the initial position to complete this routine.

Figure 6:
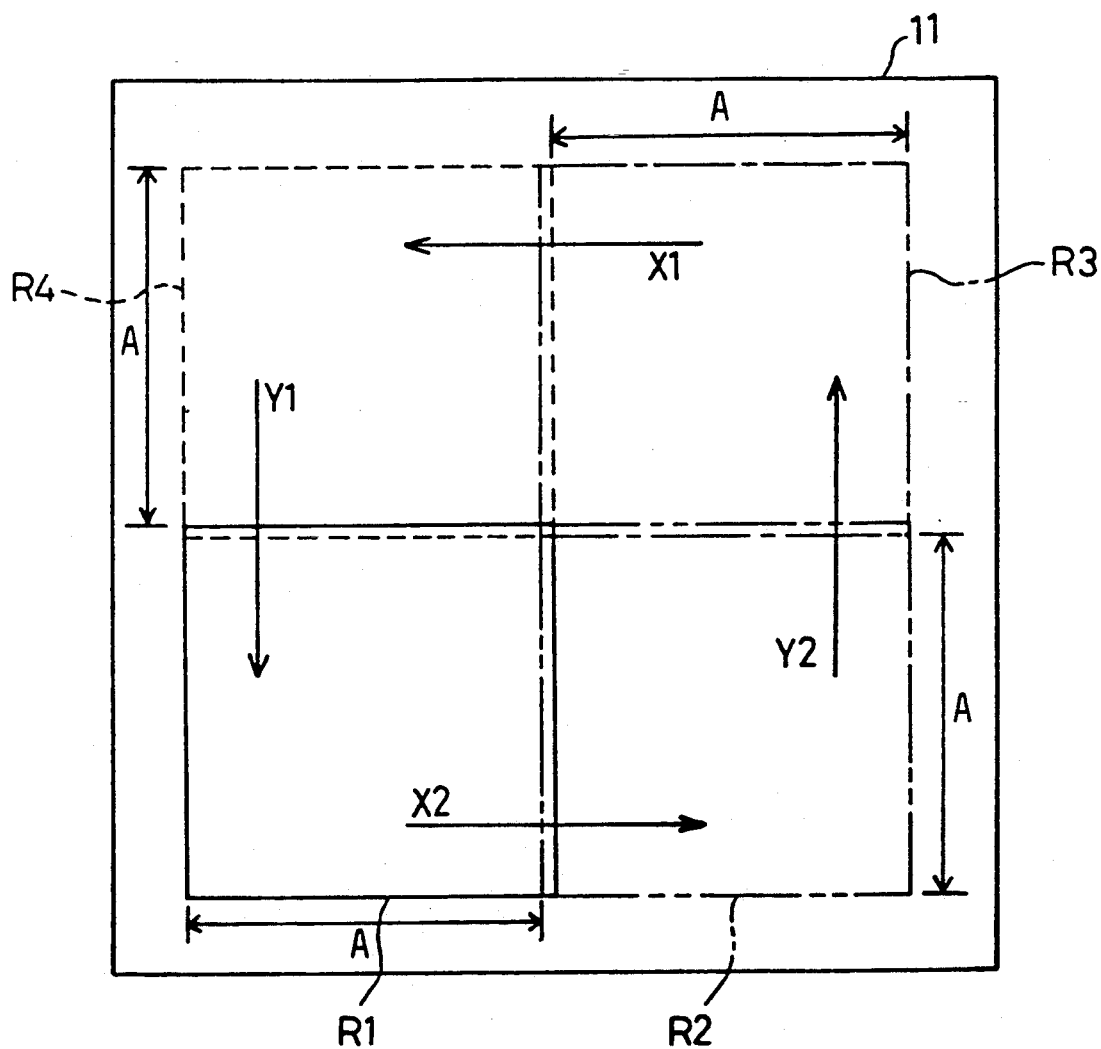
FIG. 6 is an explanatory view showing exposed areas of the present invention.
Figure 7:
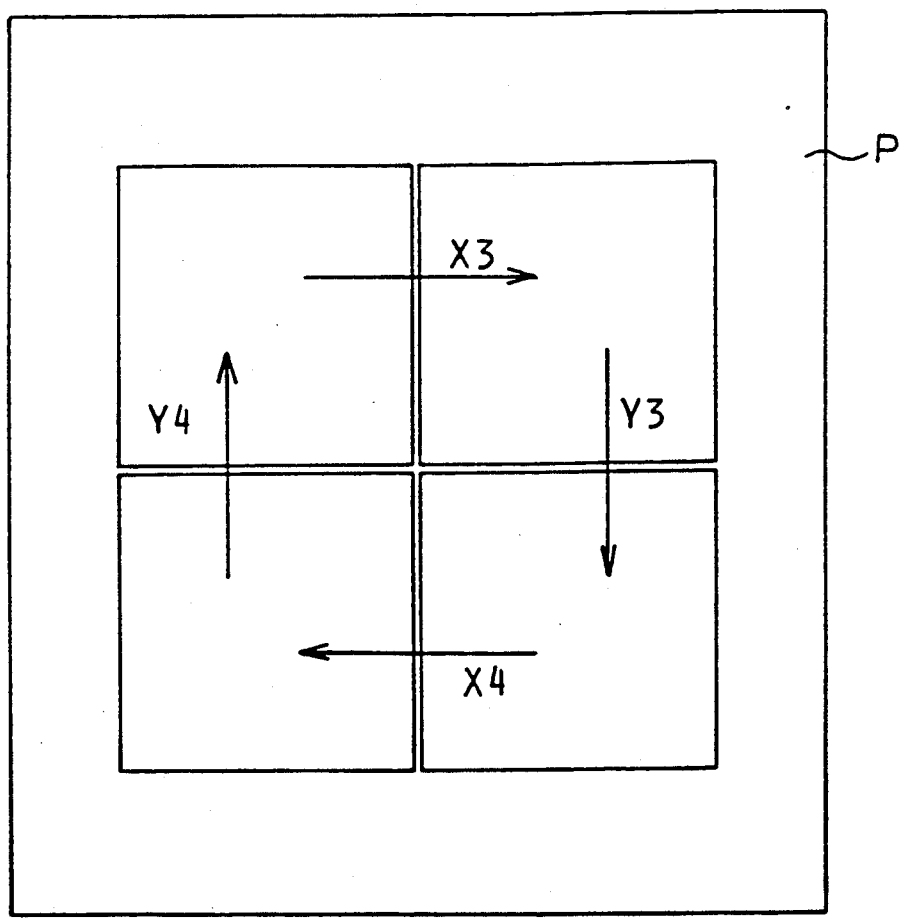
FIG. 7 is an explanatory view showing a non-exposed area between pixels the presence of which is a problem involved in the prior art.

When this routine is completed, therefore, even in the portion where light is intercepted by the wiring pattern 7b resulting in an unexposed portion in the prior art, an exposure processing corresponding to image data is performed by the processing beginning at step 160. More specifically, as shown in FIG. 6, after the completion of the above routine, the first exposure area R1 indicated by a solid line, the second exposure area R2 indicated by a two-dash chain line, the third exposure area R3 indicated by a one-dash chain line, and the fourth exposure area R4 indicated by a broken line, slightly overlap one another at the respective end portions on the photosensitive paper 11. Consequently, there is no longer such an unexposed area as shown in FIG. 7, whereby the contrast and quality of the recorded image can be improved.

According to the image recording system 1 of this embodiment, as set forth above, there is no longer an undesired exposed portion formed by the wiring pattern 7b between adjacent pixels 7a. Further, since the spacing between adjacent pixels 7a is set slightly shorter than the length of one side of each pixel 7a, an exposed portion is not formed at all between adjacent exposure areas. As a result, an image corresponding to image data is exposed uniformly to the photosensitive paper 11, whereby the contrast and quality of the recorded image are greatly improved. Further, it is not necessary to increase the percent opening of the LCD panel 7a itself and the wiring pattern 7b can be made sufficiently large, so the fabrication of the LCD panel is easy.

Although in the above embodiment the same image data is used in each of the shifted positions in steps 160, 200 and 240, different image data may be recorded in those positions, followed by change-over from one to another image, whereby there can be attained the effect of further enhancing the resolution in addition to the foregoing effect. More specifically, different image data can be stored for the four positions and the image data can be changed over by one frame at a time in synchronism with movement to each position, thereby changing over from one to another image plane on the LCD panel 7 for each position.

There also may be adopted a construction wherein an unexposed portion is eliminated by moving the photosensitive paper 11. In this case, the photosensitive paper 11 is moved in the directions of X1, X2, Y1 and Y2 not by the X-axis and Y-axis driving mechanisms 13, 15 but by mechanisms similar thereto.

Although an embodiment of the present invention has been described above, the invention is not limited thereto at all. For example, images may be recorded in color display by providing R, G and B filters and changing over among image planes for R, G and B. An image recording system embodying the present invention may employ a reflection type LCD panel and CRT. It goes without saying that various modifications may be made within the scope not departing from the gist of the present invention.

According to the image recording system of the present invention, as described in detail hereinabove, it is possible to effect exposure even in the position corresponding to a non-pixel area between pixel areas, whereby there is attained an extremely superior effect such that there is no deterioration in contrast and quality of the resultant recorded image.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An image recording system for recording an output image on a photosensitive member by exposure of a light image formed on an image plane, comprising:
   a plurality of pixels and a non-pixel area constituting the image plane, the non-pixel area surrounding the plurality of pixels, each of the plurality of pixels having a uniform size and being capable of changing over between a first state in which the exposure of light to the photosensitive member is permitted and a second state in which the exposure of light to the photosensitive member is interrupted, a total area of the pixels being set to a value larger than (100/n)% of the area of the image plane, where n is an integer number;
   a relative position changing means for changing a relative position between the photosensitive member and the image plane in a direction substantially perpendicular to a light traveling path from the image plane to the photosensitive member, and
   an exposure position controlling means for driving the relative position changing means to change the relative position at least (n−1) times so that the recording of the non-pixel area is prevented in the output image recorded on the photosensitive member.

2. The image recording system according to claim 1, wherein the value of n is 4.

3. The image recording system according to claim 2, wherein the pixels are each in the shape of one of a rectangle or a square.

4. The image recording system according to claim 1, wherein when said exposure position controlling means drives said relative position changing means to change the relative position between the photosensitive member and the image plane, all the pixels are in the second state.

5. The image recording system according to claim 1, wherein said relative position changing means comprises at least one driving mechanism.

6. The image recording system according to claim 5, wherein said relative position changing means comprising two driving mechanisms.

7. The image recording system according to claim 6, wherein one said driving mechanism changes the relative position between the photosensitive member and the image plane along one axis substantially perpendicular to said light traveling path and the other said driving mechanism changes the relative position between the photosensitive member and the image plane along another axis substantially perpendicular to said light traveling path.

8. The image recording system according to claim 1, wherein said relative position changing means changes the position of said image plane.

9. The image recording system according to claim 1, wherein said exposure position controlling means drives said relative position changing means at least (n−1) times such that a plurality of exposure areas are formed, said exposure areas overlapping one another.

10. An image recording system for recording an output image on a photosensitive member by exposure of a light image formed on an image plane, comprising:
    a plurality of pixels arranged in a predetermined pitch and a non-pixel area constituting the image plane, the non-pixel area surrounding the plurality of pixels, each of the plurality of pixels having a uniform size and being capable of changing over between a first state in which the exposure of light to the photosensitive member is permitted and a second state in which the exposure of light to the photosensitive member is interrupted, a size of each of the pixels being set to a length larger than one half of the predetermined pitch;
    a relative position changing means for changing a relative position between the photosensitive member and the image plane in a direction substantially perpendicular to a light traveling path from the image plane to the photosensitive member; and
    an exposure position controlling means for driving the relative position changing means to change the relative position at least three times so that the recording of the non-pixel area is prevented in the output image recorded on the photosensitive member.

11. An image recording system according to claim 10, wherein when said exposure position controlling means drives said relative position changing means to change the relative position between the photosensitive member and the image plane, all the pixels are in the second state.

12. The image recording system according to claim 10, wherein said relative position changing means comprises at least one driving mechanism.

13. The image recording system according to claim 12, wherein said relative position changing means comprising two driving mechanisms.

14. The image recording system according to claim 13, wherein one said driving mechanism changes the relative position between the photosensitive member and the image plane along one axis substantially perpendicular to said light traveling path and the other said driving mechanism changes the relative position between the photosensitive member and the image plane along another axis substantially perpendicular to said light traveling path.

15. The image recording system according to claim 10, wherein said relative position changing means changes the position of said image plane.

16. The image recording system according to claim 10, wherein said exposure position controlling means drives said relative position changing means at least three times such that a plurality of exposure areas are formed, said exposure areas overlapping one another.

* * * * *